(12) United States Patent
Kramer

(10) Patent No.: US 11,192,402 B2
(45) Date of Patent: Dec. 7, 2021

(54) REINFORCING PLY FOR ARTICLES CONSISTING OF AN ELASTOMERIC MATERIAL, AND VEHICLE PNEUMATIC TIRES

(71) Applicant: Continental Reifen Deutschland GmbH, Hannover (DE)

(72) Inventor: Thomas Kramer, Herford (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 16/961,255

(22) PCT Filed: Dec. 3, 2018

(86) PCT No.: PCT/EP2018/083256
§ 371 (c)(1),
(2) Date: Jul. 10, 2020

(87) PCT Pub. No.: WO2019/141423
PCT Pub. Date: Jul. 25, 2019

(65) Prior Publication Data
US 2021/0061014 A1    Mar. 4, 2021

(30) Foreign Application Priority Data
Jan. 16, 2018   (DE) .................. 10 2018 200 634.2

(51) Int. Cl.
*B60C 9/20*    (2006.01)
*B60C 9/00*    (2006.01)
(Continued)

(52) U.S. Cl.
CPC .......... *B60C 9/2003* (2013.01); *B60C 9/0042* (2013.01); *B60C 2009/0085* (2013.01);
(Continued)

(58) Field of Classification Search
CPC ....... B60C 9/00; B60C 9/0007; B60C 9/0028; B60C 9/0042; B60C 9/18; B60C 9/1807;
(Continued)

(56) References Cited

U.S. PATENT DOCUMENTS

| 4,850,412 | A | 7/1989 | Gupta |
| 2001/0042581 | A1 | 11/2001 | Boiocchi et al. |

(Continued)

FOREIGN PATENT DOCUMENTS

| DE | 3877117 T2 | 5/1993 |
| EP | 0374356 A2 | 6/1990 |

(Continued)

OTHER PUBLICATIONS

Kenji Kaneko, JP-2012176678-A, machine translation. (Year: 2012).*
(Continued)

*Primary Examiner* — Robert C Dye
*Assistant Examiner* — Sedef E Paquette
(74) *Attorney, Agent, or Firm* — David L. Cate; Gregory Adams

(57) ABSTRACT

A rubberized reinforcing ply (1) for articles consisting of an elastomeric material, preferably for vehicle tires, wherein the reinforcing ply (1) has a multiplicity of textile strengthening members (2) which are arranged parallel to and spaced apart from one another, wherein each textile strengthening member (2) is composed of at least one twisted multifilament yarn, and wherein the textile strengthening member (2) is not composed of the material rayon. The reinforcing ply (1) satisfies the following condition: ($D^2/E_0$) in mm corresponds to a value in a range from 0.22 mm to 0.38 mm, and the reinforcing ply (1) has a strength of >10 kN/dm, where D is the diameter of the textile strengthening member (2) in mm and lies in a range from 0.38 mm to 0.52 mm, and where $E_0=100/\text{epdm}$.

6 Claims, 1 Drawing Sheet

(51) Int. Cl.
 *B60C 9/04* (2006.01)
 *B60C 9/22* (2006.01)
(52) U.S. Cl.
 CPC .............. *B60C 2009/0092* (2013.01); *B60C 2009/0425* (2013.01); *B60C 2009/0441* (2013.01); *B60C 2009/0466* (2013.01); *B60C 2009/0475* (2013.01); *B60C 2009/209* (2013.01); *B60C 2009/2051* (2013.01); *B60C 2009/2077* (2013.01); *B60C 2009/2083* (2013.01); *B60C 2009/2096* (2013.01); *B60C 2009/2257* (2013.01); *B60C 2009/2285* (2013.01)
(58) Field of Classification Search
 CPC .............. B60C 9/2003; B60C 9/2006; B60C 2009/0035; B60C 2009/0071; B60C 2009/0085; B60C 2009/0092; B60C 2009/0425; B60C 2009/0441; B60C 2009/045; B60C 2009/0466; B60C 2009/0475; B60C 2009/2051; B60C 2009/2077; B60C 2009/2083; B60C 2009/209; B60C 2009/2096; B60C 2009/2257; B60C 2009/2266; B60C 2009/2276; B60C 2009/2285

USPC .................................. 152/526, 527, 548, 556
See application file for complete search history.

(56) References Cited

U.S. PATENT DOCUMENTS

| | | | | |
|---|---|---|---|---|
| 2010/0116400 | A1* | 5/2010 | Yamaguchi | B60C 17/0009 152/517 |
| 2012/0267027 | A1 | 10/2012 | Nojek et al. | |
| 2016/0107487 | A1* | 4/2016 | Rajan | B60C 9/0064 152/527 |
| 2019/0299718 | A1 | 10/2019 | Reese et al. | |

FOREIGN PATENT DOCUMENTS

| | | | |
|---|---|---|---|
| EP | 0908329 | A2 | 4/1999 |
| EP | 2759624 | A1 | 7/2014 |
| JP | 2012176678 | A * | 9/2012 |
| WO | 2011082844 | A1 | 7/2011 |
| WO | 2017211546 | A1 | 12/2017 |

OTHER PUBLICATIONS

International Search Report dated Feb. 5, 2019 of PCT/EP2018/083256 which this application is based on.

* cited by examiner

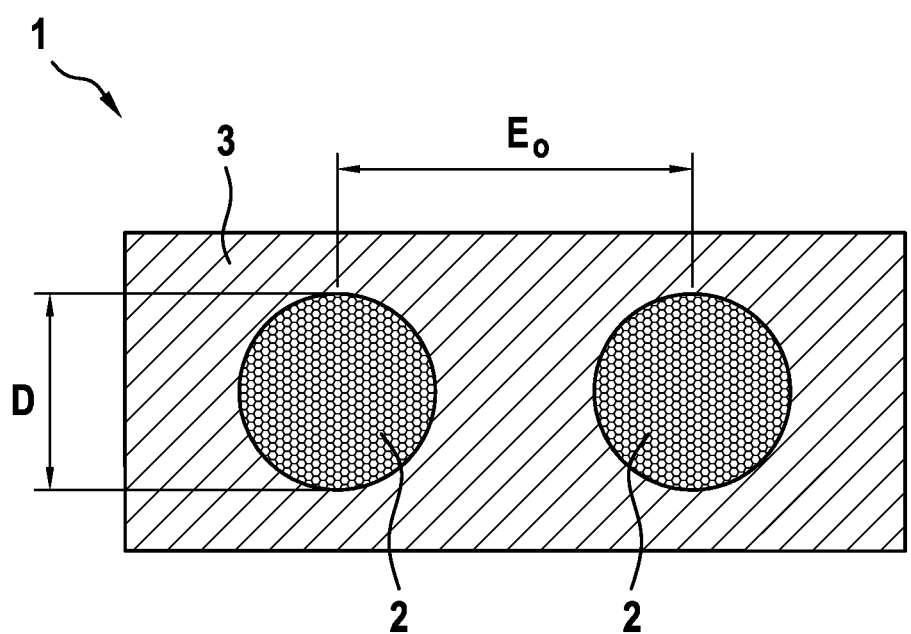

REINFORCING PLY FOR ARTICLES CONSISTING OF AN ELASTOMERIC MATERIAL, AND VEHICLE PNEUMATIC TIRES

The invention relates to a rubberized reinforcing ply for articles consisting of an elastomeric material, preferably for vehicle tires, wherein the reinforcing ply has a multiplicity of textile strengthening members which are arranged parallel to and spaced apart from one another, wherein each textile strengthening member is composed of at least one twisted multifilament yarn, and wherein the textile strengthening member is not composed of the material rayon. The invention further relates to a vehicle pneumatic tire.

Reinforcing plies for articles consisting of an elastomeric material such as, for example, industrial rubber products and vehicle (pneumatic) tires are extremely important and are generally known to a person skilled in the art. The reinforcing plies have a multiplicity of reinforcing, thread-shaped elements, referred to as the strengthening members. They are embedded completely in elastomeric material. The strengthening members of these reinforcing plies have the form, for example, of fabrics or of calendered, continuously coiled strengthening members.

The rubberized reinforcing plies of suitable size and design are joined to further components in order to form an industrial rubber product or a vehicle pneumatic tire. Here, the rubberized reinforcing plies reinforce the product in question.

A reinforcing ply having textile cords made up of multifilament yarns composed of PET, PEN and aramid has been disclosed in EP 0 908 329 B1. Owing to the yarn linear density used and the construction of the PEN cords, they are comparatively thin, and so the rubberized reinforcing ply has a comparatively low ply thickness. This firstly has the advantage that less rubber material has to be used for rubberizing of these strengthening members, which saves material costs. Secondly, a thin rubberized reinforcing ply in the product, for example in the vehicle tire, has the advantage that the weight of the tire is reduced and produces a lower hysteresis, which has a positive effect on the rolling resistance of the tire.

However, in addition to the weight reduction and the lower hysteresis owing to a thin ply thickness, the strength of this reinforcing ply is also essential in order to be able to sufficiently take up the forces occurring in the tire.

It is therefore an object of the invention to provide a reinforcing ply for articles consisting of an elastomeric material, which reinforcing ply is of comparatively thin form and nevertheless has sufficient strength for the forces which occur in the tire. It is a further object of the invention to provide a vehicle pneumatic tire which, while having good structural durability, is optimized in terms of rolling resistance.

The object is achieved with regard to the reinforcing ply in that the reinforcing ply satisfies the following condition:
  ($D^2/E_0$) in mm corresponds to a value in a range from 0.22 mm to 0.38 mm, and in that the reinforcing ply has a strength of 10 kN/dm<x<25 kN/dm,
  where D is the diameter of the textile strengthening member in mm and lies in a range from 0.38 mm to 0.52 mm, and
  where $E_0$=100/epdm.

A reinforcing ply is created which has strengthening members with comparatively small diameters. The rubberizing of the reinforcing ply, in particular its thickness, is configured in a manner which is customary to a person skilled in the art, with the result that a comparatively thin reinforcing ply is made available. This reinforcing ply has a strength of 10 kN/dm<x<25 kN/dm, which is a sufficient strength for reinforcing plies with textile strengthening members, in particular for passenger car tires.

Strengthening members composed of the material rayon are explicitly excluded from the invention.

"epdm" means ends per decimeter and describes the strengthening member density in the reinforcing ply.

The expression "strength of the reinforcing ply" means the breaking force of the reinforcing ply in kN per dm (decimeter), which is calculated from the breaking force of the individual strengthening member multiplied by the number of strengthening members per dm of this reinforcing ply, with the breaking force being determined in accordance with ASTM D885M.

In a preferred embodiment of the invention, the reinforcing ply satisfies the following condition:
  ($D^2/E_0$) in mm corresponds to a value in a range from 0.31 mm to 0.38 mm.
  An optimized compromise between ply thickness and strength is achieved with this value range. Moreover, the strengthening members are not too tightly packed in the reinforcing ply, with the result that there is still sufficient rubber in the ply to ensure force transmission between the cords.

In one preferred embodiment of the invention, the strengthening member has a diameter in a range from 0.38 mm to 0.45 mm, preferably in a range from 0.42 mm to 0.45 mm. An optimized compromise between ply thickness and strength is achieved with this value range.

It is advantageous for the tire performance if the reinforcing ply has a strength of 11 kN/dm<x<14 kN/dm. This represents the best solution in the conflict of goals between thickness of the reinforcing ply and the strength thereof.

In one preferred embodiment of the invention, the strengthening member is a cord composed of two twisted-together multifilament yarns, and the strengthening members are arranged in this reinforcing ply in a density in a range from 150 epdm to 220 epdm, preferably in a range from 170 epdm to 180 epdm. The aforementioned density is an optimized compromise between durability of the reinforcing ply and force transmission, for which a specific rubber volume must be present between the strengthening members, on the one hand, and the strength and the tire performance durability, on the other hand, for which the strengthening members must not lie too far apart in the reinforcing ply.

It is expedient if the strengthening members are composed of the material PET, PEN or of aliphatic polyamides, such as for example nylon PA66, PA46, PA6, or of aromatic polyamides, such as for example p-aramid, m-aramid, PBO, or of combinations of the aforementioned materials. Combinations of the aforementioned materials form so-called hybrid strengthening members in which one yarn is composed of a first material and one or more further yarns are composed of a second or further material different from the first material.

In one preferred embodiment of the invention, the cord has the construction 550 dtex×2 with a diameter of 0.45 mm, wherein both yarns are composed of PET and are arranged in this reinforcing ply in a density of 175 epdm, and wherein the reinforcing ply has a strength of approximately 11.38 kN/dm.

In another preferred embodiment of the invention, the cord has the construction 630×2 with a diameter of 0.51 mm, wherein both yarns are composed of PET and are arranged in this ply in a density of 175 epdm, and wherein the reinforcing ply has a strength of approximately 13 kN/dm.

With regard to the vehicle pneumatic tire, the invention is achieved in that said tire has at least one above-described reinforcing ply.

This reinforcing ply is a carcass and/or a belt bandage and/or a bead reinforcer. This reinforcing ply is preferably a carcass of a passenger car pneumatic tire.

In one specific embodiment of the invention, the vehicle pneumatic tire has, in addition to the above-described reinforcing ply, which is preferably a carcass, a belt ply composed of rubberized strengthening members, which satisfies the following condition:

($D^2/E_0$) in mm corresponds to a value in a range from 0.07 mm to 0.43 mm, and the reinforcing ply has a strength of 16.5 kN/dm<X<55 kN/dm, where D is the diameter of the strengthening member in mm, and where $E_0$=100/epdm.

It is expedient if the sum of the strengths of the reinforcing ply with textile strengthening members and of the belt ply is ≥40 kN/dm. A sufficient overall strength is ensured.

The strengthening member of the belt ply is preferably composed of at least one steel filament which has a diameter in a range from 0.26 mm to 0.35 mm. These thin diameters are advantageous for an optimized rolling resistance.

In one preferred embodiment of the invention, the strengthening member has the construction 1×0.30 mm or 2×0.30 mm and is arranged in the belt ply in a density in a range from 80 to 120 epdm. The aforementioned density is an optimized compromise between durability of the reinforcing ply and force transmission, for which a specific rubber volume must be present between the strengthening members, on the one hand, and the strength and the tire performance durability, on the other hand, for which the strengthening members must not lie too far apart in the reinforcing ply.

A steel monofilament of the construction 1×0.30 mm with a density of 110 epdm is preferably arranged in the belt ply, wherein this belt ply has a strength of approximately 24 kN/dm.

In another preferred embodiment, a steel cord of the construction 2×0.30 mm with a density of 80 epdm is arranged in the belt ply, wherein this belt ply has a strength of approximately 35 kN/dm.

The invention will be explained in more detail below with reference to a FIGURE which illustrates a schematic exemplary embodiment of the invention.

FIG. 1 shows a detail of the cross section of a reinforcing ply according to the invention for passenger car vehicle pneumatic tires.

The reinforcing ply 1 is a carcass ply. The reinforcing ply 1 has a multiplicity of textile strengthening members 2 which are arranged parallel to and spaced apart from one another and which are embedded in a rubber matrix 3. Of the strengthening members 2, two strengthening members 2 are illustrated in the detail of FIG. 1. Each textile strengthening member 2 is a cord 2 of the construction 550 dtex×2 that is composed of two twisted-together multifilament yarns. The multifilament yarns are composed of the material PET. Two PET multifilament yarns are thus twisted to form a cord 2. Each PET multifilament yarn is twisted in the same direction with a twist of 590, whereas the end twisting likewise has a twist of 590, but in the opposite direction. The diameter of the cord D is 0.45 mm, and the cord 2 is arranged in the reinforcing ply 1 with 175 epdm. ($D_2/E_0$) in mm corresponds to 0.354 mm and the reinforcing ply 1 thus satisfies the following condition:

($D^2/E_0$) in mm corresponds to a value in a range from 0.22 mm to 0.38 mm, where D is the diameter of the textile strengthening member in mm, and where $E_0$=100/epdm.

The reinforcing ply has a strength of approximately 11.38 kN/dm.

LIST OF REFERENCE NUMERALS

1 Reinforcing ply
2 Textile strengthening member/cord
3 Rubber matrix
D Diameter of the cord
$E_0$ Distance between the center points of two adjacent cords in cross section

The invention claimed is:

1. A vehicle pneumatic tire comprising at least one rubberized reinforcing ply, wherein the at least one rubberized reinforcing ply comprises an elastomeric material, a multiplicity of textile strengthening members which are arranged parallel to and spaced apart from one another, wherein each textile strengthening member of the multiplicity of textile strengthening members is composed of at least one twisted multifilament yarn, and wherein the textile strengthening member is not composed of rayon;
   wherein the at least one rubberized reinforcing ply has a ratio of $D^2/E_0$ in a range of from 0.22 mm to 0.38 mm, wherein D is the diameter of each textile strengthening member which lies in a range from 0.38 mm to 0.52 mm, and wherein $E_0$=100/epdm;
   wherein the at least one rubberized reinforcing ply has a strength in the range of from greater than 10 kN/dm to less than 25 kN/dm;
   wherein the at least one rubberized reinforcing ply is comprised in one or more of a carcass, a belt bandage or a bead reinforcer of the vehicle pneumatic tire;
   the vehicle pneumatic tire further comprising a belt ply composed of rubberized strengthening members, wherein the belt ply has a ratio of $D^2/E_0$ in a range of from 0.07 mm to 0.43 mm and a strength in the range of from greater than 22 kN/dm to less than 37 kN/dm, wherein D is the diameter of each strengthening member of the rubberized strengthening members in mm units, and wherein $E_0$=100/epdm;
   wherein the rubberized strengthening members of the belt ply comprise at least one steel filament which has a diameter in a range from 0.26 mm to 0.35 mm; and
   wherein:
      each of the textile strengthening members is textile cord having the construction of 550 dtex×2, with a diameter (D) of 0.45 mm, wherein the textile cord is composed of two PET yarns, wherein the multiplicity of textile strengthening members are arranged in the at least one rubberized reinforcing ply at a density of 175 epdm, and wherein the at least one rubberized reinforcing ply has a strength of 11.38 kN/dm,
   or
      each of the textile strengthening members is textile cord having the construction of 630 dtex×2, with a diameter (D) of 0.51 mm, wherein the textile cord is composed of two PET yarns, wherein the multiplicity of textile strengthening members are arranged in the at least one rubberized reinforcing ply at a density of 175 epdm, and wherein the at least one rubberized reinforcing ply has a strength of 13 kN/dm.

2. The vehicle pneumatic tire as claimed in claim 1, wherein the at least one rubberized reinforcing ply has a ratio of $D^2/E_0$ in a range of from 0.31 mm to 0.38 mm.

3. The vehicle pneumatic tire as claimed in claim 1, wherein the diameter of each textile strengthening member is from 0.38 mm to 0.45 mm.

4. The vehicle pneumatic tire as claimed in claim 1, wherein the at least one rubberized reinforcing ply has a strength in the range of from greater than 11 kN/dm to less than 14 kN/dm.

5. The vehicle pneumatic tire as claimed in claim 1, wherein a sum of the strength of the at least one rubberized reinforcing ply textile and the strength of the belt ply is at least 40 kN/dm.

6. The vehicle pneumatic tire as claimed in claim 1, wherein each strengthening member of the belt ply has a construction of 1×0.30 mm or 2×0.30 mm, wherein the textile strengthening members are arranged in a density in a range of from 80 to 120 epdm.

\* \* \* \* \*